United States Patent Office 3,441,651
Patented Apr. 29, 1969

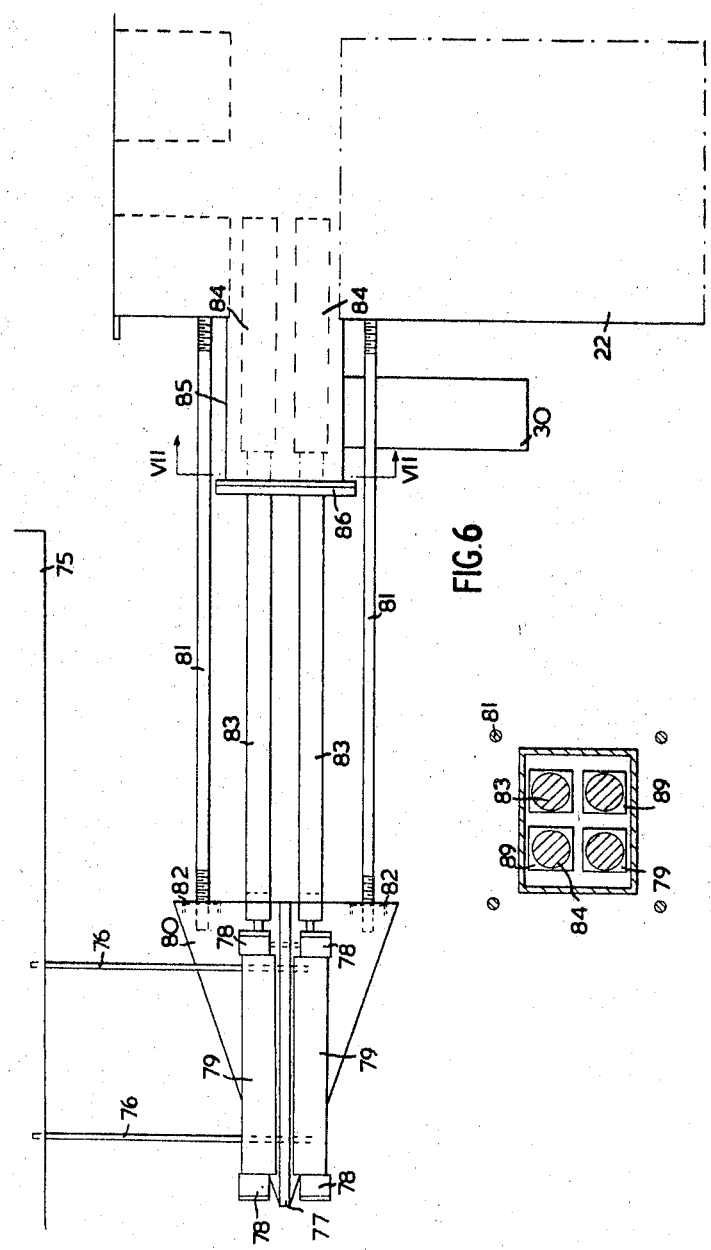

3,441,651
METHOD AND APPARATUS FOR HEAT RECOVERY IN ELECTRIC ARC FURNACES
George E. Viens, Robert A. Campbell, and George N. Banks, Ottawa, Ontario, and Roshan L. Sachdeva, Toronto, Ontario, and Guy V. Sirianni, Ottawa, Ontario, Canada, assignors to Canadian Patents and Development Limited, Ottawa, Ontario, Canada, a company of Canada
Filed Feb. 17, 1967, Ser. No. 616,984
Claims priority, application Canada, Feb. 23, 1966, 953,024
Int. Cl. H05b 7/18
U.S. Cl. 13—10                        15 Claims

ABSTRACT OF THE DISCLOSURE

This invention involves the concept of carrying out a continuous heating or reducing procedure on a metal or a metal oxide. It involves the concept of a first step and a first means for continuously feeding the metal or metal oxide to a preheating zone, such as a shaft furnace. Following this is a second step, or second means for either continuously preheating the metal or metal oxide to from 800° C. to 1200° C. or heating the metal or metal oxide while simultaneously partially reducing the metal oxide. Finally, there is the step, and the means for, periodically and cyclically injecting a measured amount of the metal or metal oxide into a reducing zone. The measured amount is correlated to provide a particular desired temperature in the reducing zone.

---

This invention relates to the preheating of ores and metals and the charging of the preheated material to an electric arc furnace. The invention also relates to the pre-reduction of ores to metals and the charging of the pre-reduced ores or metals to an electric arc furnace. Thus, the present invention is directed both to the melting of metals, and to the smelting of ores.

Electric arc furnaces have a number of metallurgic applications. Among the products which may be produced commercially are ferro alloys, fused alumina, pig iron, steel, copper matte, nickel matte and phosphorus. A disadvantage of the commercial use of such furnaces for smelting is inherent in the loss of efficiency due to the loss of the energy contained in the off-gases. For example, in the smelting of oxide ores (e.g., iron ore) with carbon as reductant, energy, both as sensible heat and potential energy (in the form of CO which could be oxidized to $CO_2$) is wasted. Another disadvantage is that heat from electrical energy is usually more expensive than heat which is obtained from fossil fuels and the initial heating of the burden to reaction temperature (in the case of an ore) or to a temperature approaching the melting temperature (in the case of a metal) can more economically be achieved by the use of heat from fossil fuels. For example, in the case of an iron ore, the temperature is usually in the range of 1000°–1200° C., while for the case of substantially completely reduced iron pellets a temperature of about 1200° C. should be used.

Electric arc furnaces would seem to be ideal for the raising of the temperature of the preheated burden to its final temperature. For example, in the case of iron ore, the reduction reactions require high temperatures and strongly reducing conditions to occur simultaneously and such conditions can be most easily achieved in the electric arc furnace. Another example of a suitable starting material would be the pellets produced according to the "SL-RN" process. Another type of material which could be used is the fragmentized ferrous scrap prepared by the "Lurmet" process as described in the Journal of Metals in May 1965. A further type would be briquettes produced by the Esso fluidized bed process. The melting of these materials in an electric arc furnace would be more economical if part of the high cost electrical energy was replaced by lower cost fossil fuels for the initial heating.

For the smelting of oxides, a number of processes have been proposed in which the sensible heat and/or potential energy in the exhaust gases is partially utilized. In some cases the gases are collected, cooled, cleaned, and used as fuel. In other cases the gases are used to preheat and/or partially pre-reduce the ore before it enters the furnace. Thus the amount of electrical energy required in the furnace is reduced. Processes for preheating and/or pre-reducing the ore have been suggested, utilizing three different types of equipment, namely the rotary kiln, the travelling grate, and some form of a shaft furnace.

However a number of deficiencies are inherent in these suggestions. The collection, cooling and cleaning of furnace off-gases is expensive, and the sensible heat contained in them is lost.

In those processes suggested to pre-reduce ore by using furnace off-gas or other reducing gas deficiencies arise since in most cases the suggested process was not designed to be embodied as an integral part of an electric furnace. The reduced product could be melted in an electric furnace to produce molten metal but the overall efficiency would be low because of the heat lost between the pre-reduction and melting stage and relatively inefficient use of off-gas.

In the few processes where the preheating and pre-reducing stages are designed to be an integral part of the electric smelting unit, carbon is present in the charge during the preheating and pre-reducing stages. In the reduction of metal oxides by carbon, the gas in equilibrium with the metal contains a high proportion of CO. For the process to have maximum efficiency, this CO should be burned to $CO_2$ in the preheating zone where the heat of the reaction and the sensible heat of the gases could be used to heat the incoming charge. This is difficult to do when carbon is present in the charge. In a shaft furnace or travelling-grate, where the gases are in intimate contact with the charge, it is not possible to completely burn the CO to $CO_2$ if carbon is present. In a rotary kiln, complete combustion can be approached because the large space above the bed of ore and carbon permits a non-equilibrium condition to exist between the gas in this space and the gas entrapped in the bed.

In one procedure suggested, finely divided iron oxide-bearing material is mixed with finely divided fluxing material and finely divided solid carbonaceous material to form a finely divided charge in which the components are intimately mixed. Combined electric arc and resistance heating are suggested for maintaining the slag bath at a temperature high enough to provide the heat required for melting the fluxing material of the charge and for promoting and effecting reduction of the iron of the iron oxide-bearing material by means of the carbonaceous reducing material. The charge is preheated by tumbling in the presence of the off-gases from the electric arc furnace to effect reduction of a portion of the iron of the iron oxide. The charge is continuously introduced into the reactor at a predetermined rate. However, the rate of introduction must be carefully controlled in order to provide adequate control over the product formed.

In another procedure suggested, a particular type of oxide may be preheated prior to reduction in an electric smelting furnace. It was suggested that the amount of carbonaceous material incorporated into the material to be reduced must be less than that required for complete reduction. Another requirement was that the preheating be at a temperature between 500° C. and 900° C., in a gas which is substantially oxygen free and contains only a limited percentage of $CO_2$. In addition, the preheated charge was admitted to the furnace by being dropped intermittently in small portions. However, this procedure suffers the disadvantage that sintering of the charge at the arc furnace inlet may impede the flow of charge into the furnace, thereby disrupting the procedure.

The present invention contemplates the combined use of suitable low cost heat together with heat derived from electrical energy. For example, in the case of smelting oxide ores, the invention contemplates the utilization of both the latent and sensible heat present in the furnace off-gas augmented if desired by energy derived from other sources, as other waste gases, or fossil fuels, to preheat and/or pre-reduce the burden in a shaft furnace. On the other hand in the case of melting metallic burdens either waste gases or fossil fuels may be used as energy to replace electrical energy used inherently to heat such burden.

It is contemplated that the SL-RN feed could be melted by the teaching of the present invention and this could result in a decrease of approximately 15% or more of the total energy requirements. It is contemplated that by another aspect of this invention this can be further reduced by the provision of recirculating gases. It is also contemplated that at least ½ of the total energy requirement which previously had been met by the use of electrical energy would be from the energy derived from waste gases and/or fossil fuels.

It is also contemplated according to the present invention to provide for the direct manufacture of steel in an electric furnace by the direct production of steel having a carbon level of about 0.2%.

It is also contemplated that it is possible to prepare pig iron with a carbon level approximately 2.5%.

By one procedure according to the present invention preheating of the burden is achieved in a shortened shaft forming part of the arc furnace of the present invention. Since the burden which is to be used already consists of metal with very little oxide present, there is very little gas formed.

In accordance with another aspect of the invention contemplated herein, reduction is achieved in a shaft furnace. This contemplates the treating of oxidic ores, for example, iron oxide pellets or sintered iron ore, in the presence of a gaseous reducing agent in the shaft furnace. It is contemplated that the oxidic ore burden would first be preheated to reduction temperature. This would then be subjected to a continuous heating in the presence of excess reducing gas (CO and/or $H_2$) to achieve removal of the oxygen from the ore while the ore is still solid to form the pre-reduced burden. This pre-reduced burden is then fed to the arc furnace. Any solid reducing agent, such as carbon, would be added directly to the electric arc furnace to complete reduction. For the production of steel or pig iron the carbon necessary for the control of the carbon content of the metal would be added in this way.

By the present invention therefore, it is contemplated that there is an efficient use of the energy of partially burned gas or oil. In addition, the shaft furnace insures optimum contact between the hot gases and the burden. In the melting procedures contemplated by aspects of the present invention the gas energy is used in the preheating procedure rather than electrical energy, thereby providing a net reduction in the cost of energy.

An object therefore of a broad aspect of the present invention is to provide a process and an apparatus for the reduction of an oxide in an electric arc furnace.

It is an object of another aspect of the present invention to provide a process and an apparatus for the preheating of metallic burdens prior to their feeding to an electric arc furnace.

An object of a further aspect of the present invention is to provide a process and an apparatus for the preheating and reduction of oxidic ores prior to their introduction into an electric arc furnace.

An object of another aspect of the present invention is the provision of a process for the reduction of iron oxide in a combined shaft-furnace-electric arc furnace.

An object of another aspect of the present invention is the provision of a process for the preheating of metallic burdens prior to their introduction into an electric arc furnace so that the entire melting procedure in the arc furnace can be carried out in a more efficient manner than heretofore possible.

An object of a still further aspect of the present invention is the provision of a process for the preheating and prereduction of iron oxide prior to its introduction into an electric arc furnace so that the entire reduction procedure may be carried out in a more efficient manner than heretofore possible.

By a broad aspect of the present invention, there is now provided a process which comprises: continuously feeding a burden to a preheating zone; continuously preheating the burden in said zone; periodically and cyclically injecting a predetermined quantity of the preheated burden to an arc furnace; correlating that predetermined amount with the temperature desired within the arc furnace, the temperature being dependent upon the nature of the final product.

By another aspect of the present invention, the procedure involved is a melting procedure, wherein the burden is a pre-reduced iron oxide pellet, such as those provided by the SL-RN process, the fragmentized ferrous scrap prepared by the "Lurmet" process or the briquette formed by the Esso fluidized bed procedure. The present invention is also directed in another aspect to a smelting procedure where the burden is an oxidic ore.

Preferably also the preheating zone is a shaft furnace whose effluent feeds an arc furnace.

In one preferred embodiment, the burden is preheated to a temperature of about 800° C. to 1200° C., preferably by means of the sensible heat contained in the off-gases produced in an electric arc furnace. Alternatively, the sensible heat may be produced within the shaft furnace by combustion of residual gases not used in the prereduction step.

In another preferred embodiment, it is desired to preheat and simultaneously partially reduce the oxide ore in the solid state to its metal in the shaft furnace by feeding the burden countercurrently to the hot reducing gas from the arc furnace and/or other reducing gases introduced along the height of the shaft furnace or introduced through the wall of the arc furnace.

By another aspect of the present invention, there is provided an apparatus comprising: a preheating zone; means for continuously feeding a burden to said preheating zone; an electric arc furnace adjacent the preheating zone; a connecting zone connecting the electric arc furnace to the preheating zone; and reciprocal pushing means in the connecting zone for periodically injecting a predetermined amount of feed to the furnace.

Preferably the preheating zone may be a prereduction zone. It is also contemplated that the preheating zone may be a vertical shaft furnace.

Preferably also, there is provided gas inlet means along the length of the shaft furnace.

Preferably also, there is provided means for conducting hot gases from the arc furnace to the vertical shaft furnace.

Preferably, there is also provided a means to provide auxiliary heat directly to the electric arc furnace, suitably by means conducting hot gases to the arc furnace, even though the gases may not originate in the vertical shaft furnace.

In one aspect of the present invention, the reciprocal pushing means in the connecting zone is a single large ram. In another more preferred embodiment of the present invention, a plurality, for example, four rams are provided which can be programmed to provide a predetermined and preselected sequence of operation depending upon the conditions in the arc furnace. By means of the plurality of rams, there is little fusion or sintering of the burden being fed into the arc furnace or obstruction of the flow of gas from the arc furnace to the shaft furnace.

One aspect of the present invention includes the circulation of partially combusted gases to provide auxiliary gases within the arc furnace, the roof temperature may be reduced. This would lower the refractory cost and also reduce heat loss. By such controlled combustion the temperature in the shaft furnace may be controlled to that desired for preheating and pre-reduction. It is contemplated that the electric arc furnace per se may well be operated in the conventional manner, as a source of heat from the arc.

In the accompanying drawings,

FIG. 6 is a vertical cross-section of a modified and preferred reciprocal pushing means for use in an apparatus according to one embodiment of the invention;

FIG. 7 is a section along the line VII—VII of FIG. 6; and

Figure 1:
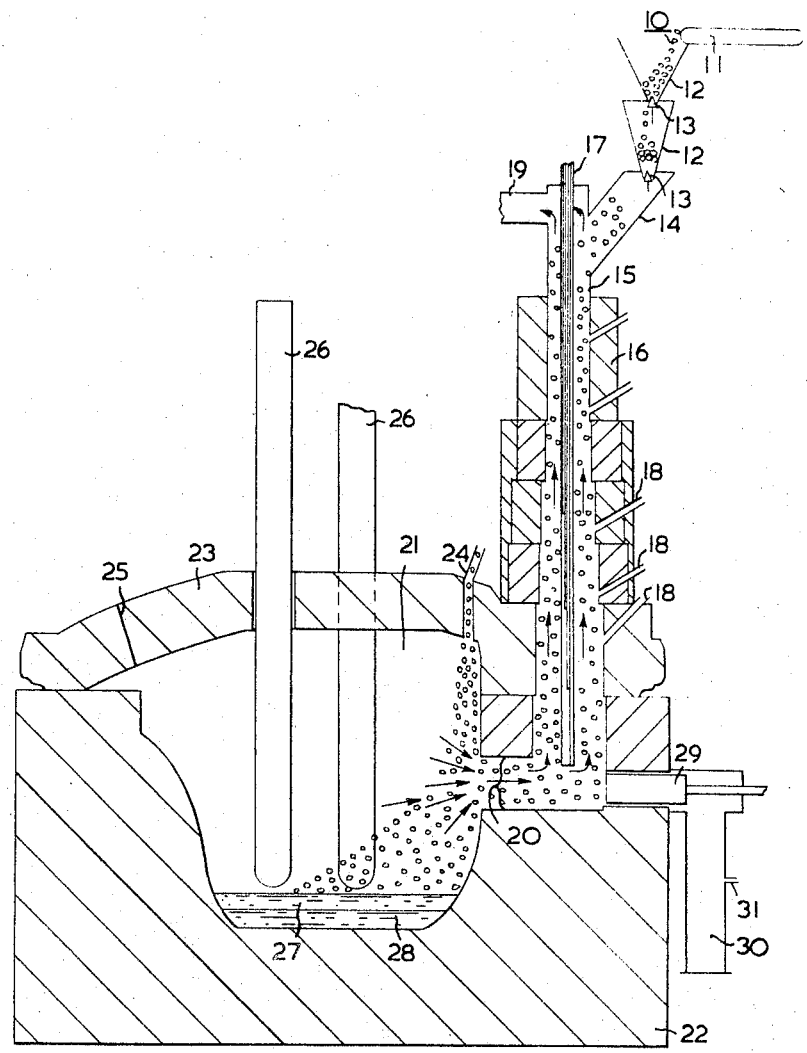
FIG. 1 is a diagrammatic vertical cross-section of one apparatus constructed in accordance with the present invention for carrying out one procedure of the present invention.

In FIG. 1 burden 10 is fed via conveyor belt 11 to a pair of feed hoppers 12 which are provided with a pneumatically or hydraulically operated feed valve 13 which permits the burden to be admitted to the inlet 14 of the vertical shaft furnace 15.

The shaft furnace is formed of a plurality of refractory bricks 16, to provide a gradually increasing cross-sectional area near the effluent of the shaft. A central thermocouple tube 17 (provided with six thermocouples) is fitted within the shaft for the purpose of determining the temperature of the burden within the shaft furnace. A plurality of ports 18 for the introduction of either air or reducing gas are provided along the length of the shaft furnace. The shaft furnace is provided with an upper gas exit line 19. Also, the shaft furnace discharges into a connecting zone 20 connecting with an arc furnace 21.

The arc furnace is provided with a refractory base 22 and a refractory cover 23. The cover is provided with a port 24 for feeding fuel or reductant and a roof thermocouple 25 for temperature measurement. Three electrodes 26, only two of which are shown, are connected to a conventional electric arc furnace transformer and power supply and extend through the cover 23. In the drawing slag 27 floats on the molten metal.

A ram 29 powered either pneumatically or hydraulically, feeds the preheated burden into the arc furnace 21. Associated with the ram 29 is a clean out 30 and a gas port 31 for pressure equilibrium.

Figure 2:
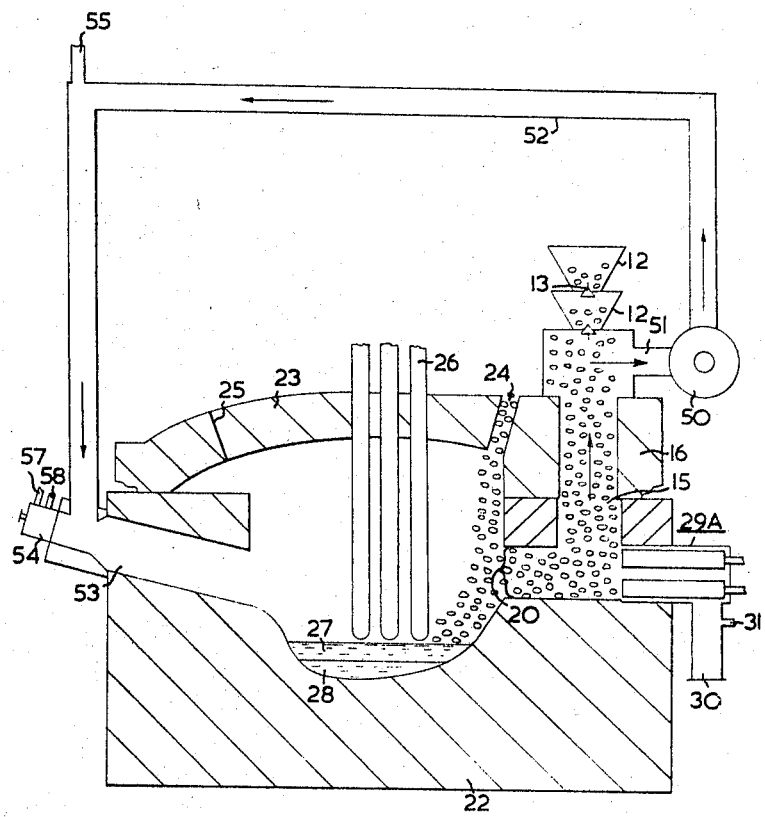
FIG. 2 is a diagrammatic vertical cross-section of another apparatus constructed according to the present invention, for carrying out another procedure in accordance with the present invention.

The furnace shown in FIGURE 2 embodies several modifications. An exhaust fan 50 is connected via inlet line 51 and outlet line 52 to a burner port 53 leading from the exhaust of a gas or oil burner 54 to the interior chamber of the furnace. Line 52 is also provided with a flare 55. The shaft furnace 15 is of reduced height specifically for the preheating of metal burdens.

The ram 29A shown in FIGURE 2 is a modification which will be described hereinafter with respect to FIGURES 6 and 7.

Figure 3:
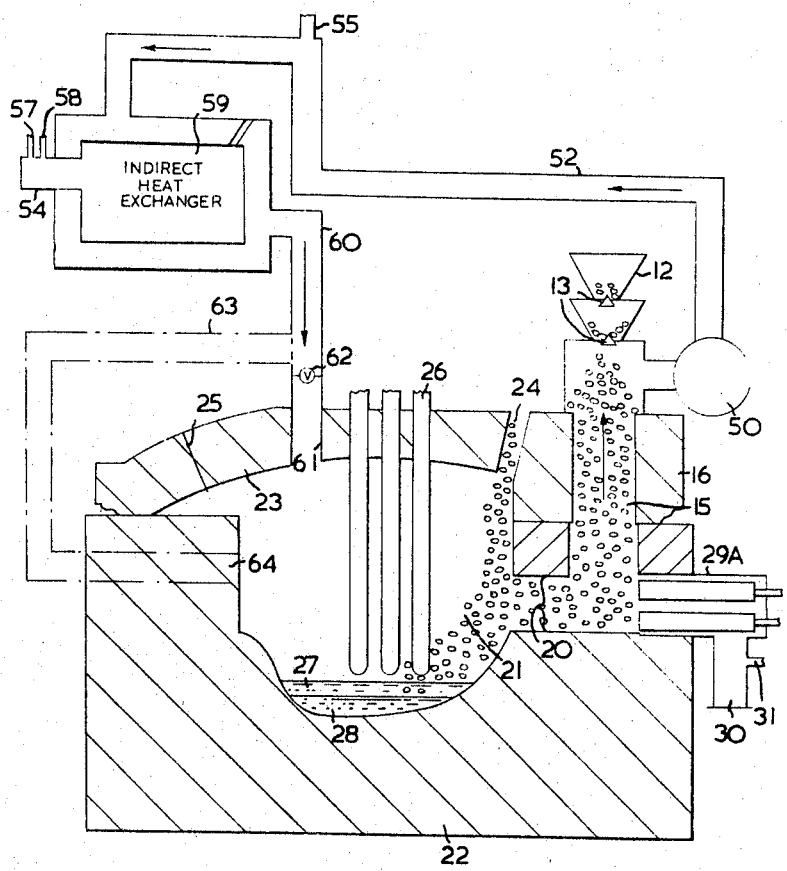
FIG. 3 is a diagrammatic vertical cross-section of another apparatus constructed according to another aspect of the present invention for carrying out a procedure according to another aspect of the present invention.

In the embodiment shown in FIGURE 3, which is a modification of the embodiment of FIGURE 2, the exhaust gas recovered from the shaft furnace 21 is fed to the outer chamber of a heat exchanger 59, where it is further heated by the exhaust of a gas or oil fired burner 54 fed, as in FIGURE 2, by fuel line 57 and an air or oxygen line 58. The heated gases may be admitted to the furnace 21 via opening 61 in the cover via line 62 or through a side aperture 64 via line 63. The furnace would be constructed either with line 62 or with line 63, but not with both.

Figure 4:
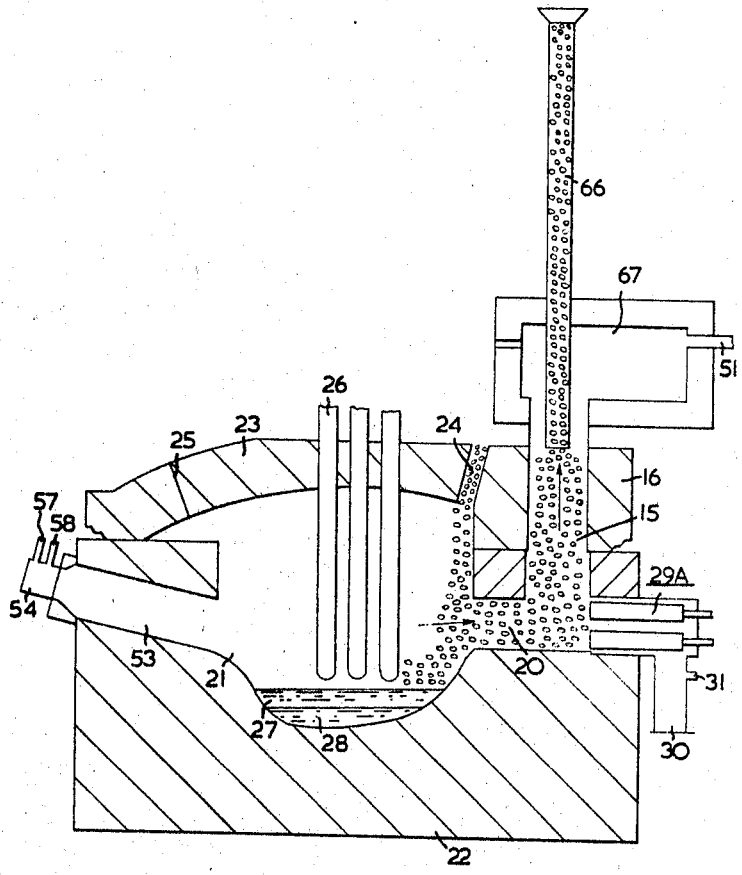
FIG. 4 is a diagrammatic vertical cross-section of yet another apparatus constructed according to yet another aspect of the present invention, for carrying out a further procedure according to the present invention.

In the embodiment shown in FIGURE 4, the vertical shaft furnace 15 is fed by means of a feed pipe 66. Exhaust gases from the furnace 21 pass into a waste heat boiler 67 and are then exhausted via outlet 51. Additional sensible heat from the exhaust of the gas or oil burner 54 is admitted to the furnace 21 via inlet 53.

Figure 5:
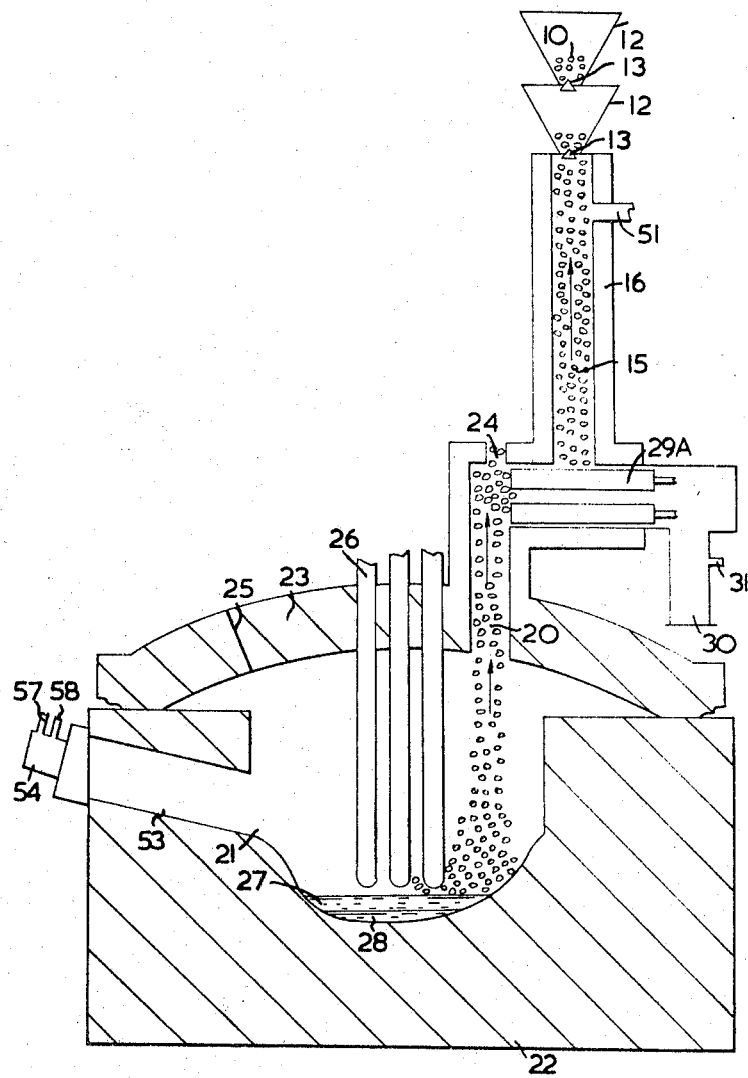
FIG. 5 is a diagrammatic vertical cross-section of still another apparatus constructed according to the present invention for carrying out a procedure in accordance with the present invention.

A further modification is shown in FIGURE 5. In this case, the ram 29A feeds the burden 10 from the shaft furnace 15 into a vertically extending connecting zone 20 which is coextensive with the port 24 in the cover 23. While connecting zone 20 is shown as containing burdens, it will be appreciated that such zone would be free of burden after each ram stroke. In addition, further sensible heat may be generated by gas or oil burner 54 whose exhaust is fed into the furnace 21 via inlet 53.

As shown in FIGURES 6 and 7, an angle iron beam 75 is secured to a fixed beam not shown. Suspended from beam 75 is a pair of hanger rods 76 which secure an anchor plate 77 in position. Secured to anchor plate 77 are the cylinder portions 78 of four hydraulic cylinders 79, disposed in the four quadrants (see FIGURE 7). Secured to respective opposite side edges of the anchor plate 77 are a pair of A plates 80 to provide for rigid positioning of the hydraulic cylinders 79 with respect to the furnace 22.

Four tie rods 81 hold the hydraulic cylinder units fixed with respect to the furnace 22. Thus, each rod 81 is secured at one end to bracket 82 inter-connecting the A-plates 80, and at its other end to the furnace 22. The movable piston rods 83 of the hydraulic cylinders 79 are each provided with a ram 84 (of essentially circular cross-section) adapted to be used to urge the burden into the furnace. The rams 84 and rods 83 enter the furnace 22 through opening 85 in the side wall thereof. Opening 85 is provided with a seal plate 86.

By suitable activation of the cylinders 79, the rams 84 provide a means of periodically intermittently injecting burden into the furnace.

Figure 8:
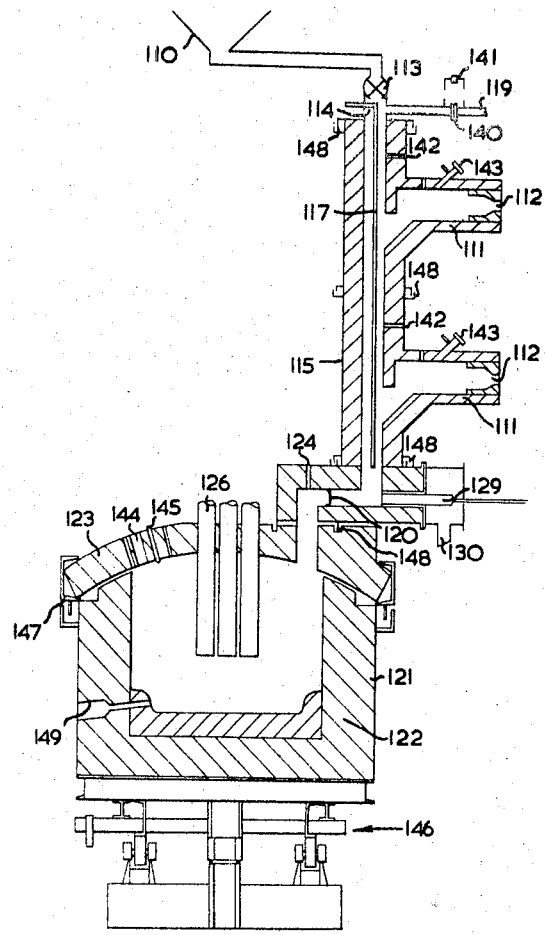
FIG. 8 is a diagrammatic vertical cross-section of an apparatus constructed in accordance with yet another embodiment of this invention for carrying out one procedure according to a further aspect of this invention.

Turning now to FIGURE 8, there is shown a vibratory type feeder 110 which is provided for feeding a burden (not shown) through a rotary valve 113 to the inlet 114 of a vertical shaft furnace 115.

The shaft furnace is provided with a pair of horizontally disposed preheat combustion boxes 111, spaced apart along the vertical length of the shaft furnace 115. Each of the preheat combustion boxes is provided with a preheat gas burner 112. A central thermocouple tube 117 is fitted within the shaft for the furnace 115 for the purpose of determining the temperature within the shaft furnace 115. The shaft furnace 115 is provided with an upper gas exhaust line 119, provided with an orifice plate 140 and a flow meter 141, for the purpose of measuring the amount of exhaust gases vented off. The shaft furnace 115 as well as the preheat combustion boxes 111 are provided with gas sampling tubes 142. The preheat combustion boxes 111 are each fitted with a sight glass 143 to enable visual inspection. The shaft furnace 115 discharges into a connecting zone 120 contacting with a rotary arc furnace 121. The roof of such connecting zone is provided with a port 124 for feeding fuel or reductant into the furnace 121.

The rotary arc furnace 121 is provided with a refractory base 122 and a refractory cover 123. Three electrodes 126 are connected to a conventional electric arc furnace transformer and power supply and extend through the cover 123. An inlet 144 is provided for an immersion thermocouple (not shown) for determining the temperature of metal and/or slag from the arc furnace 121. The cover 123 is also provided with a radiomatic temperature indicator 145. The base 122 of the furnace 121 is provided with conventional furnace rotating mechanism 146, which, since it forms no part of the present invention, will not be described in detail. Since the furnace base 122 rotates relative to the cover 123, a sand seal 147 is provided therebetween. Sand seals 148 are also provided at other joints. The arc furnace 121 is also provided with a tap hole 149.

A ram 129, which is square in cross-section and is powered either pneumatically or hydraulically feeds preheated burden from the connecting zone 120 to the furnace 121. Associated with the ram 129 is a clean out port 130.

A series of tests was conducted to demonstrate the utility of the present invention for melting metalized burdens. They are summarized below.

| Test No | 1 | 2 |
|---|---|---|
| Material melted | Pig iron | Pellets | Pellets |
| Preheat temperature in the shaft (° C.) | | 1,000 | 1,000 |
| Feed Rate (lb./hr.): | | | |
| Pellets | | 660 | 618 |
| Pig iron | (¹) | | |
| Coke | | 46 | 43 |
| Metal tapping temperature (° C.) | 1,420 | 1,460 | 1,465 |
| | | 1,545 | |
| Chemical analysis (percent): | | | |
| C | 1.96 | 2.08 | 1.9 |
| Si | 0.07 | 0.1 | 0.1 |
| lectrical energy consumption (percent of that required to melt 2,000 lb. of 2% carbon pig iron) | 100 | 61 | 56 |

¹ Pig iron was all precharged and then melted.

A second series of tests was conducted to demonstrate the utility of the present invention for smelting iron oxide sinter. They are summarized in the table below:

*Material smelted: sintered iron ore*

Preheat temperature in the shaft furnace (° C.) -- 1100
Feed rate of sinter (lbs./hr.) -- 300
Feed rate of coke (lbs./hr.) -- 49
Metal tapping temperature (° C.) -- 1500
Ore reduction in the shaft furnace (Expressed as removal of oxygen (percent)) -- 23
$CO_2/CO$ ratio in the gases exhausted from the shaft -- 1.75
CO from the electric arc furnace oxidized by iron oxide in the shaft (percent) -- 22
CO from the electric arc furnace oxidized by air in the shaft to preheat sinter (percent) -- 44

We claim:
1. A process which comprises:
   (a) continuously feeding a "burden" of metal or metal oxide to a preheating zone formed by a shaft furnace,
   (b) continuously simultaneously preheating and partially reducing the "burden" to metal in said zone by feeding countercurrently to the "burden" hot reducing gas along the height of the shaft furnace,
   (c) periodically and cyclically injecting a predetermined quantity of said preheated burden to a reducing zone formed by an electric arc furnace, and
   (d) correlating said predetermined amount with the temperature desired within said reducing zone, the the temperature being dependent on the nature of the final product.

2. The process of claim 1 wherein said "burden" is in the form of iron pellets or iron oxide pellets preheated to a temperature of about 800° C.–1200° C. by means of sensible heat produced in said electric arc furnace.

3. An apparatus for charging an electric arc furnace with a preheated charge comprising
   (a) shaft furnace means including a preheating zone;
   (b) means for continuously feeding charge material into one end of said preheating zone;
   (c) the other end of said preheating zone being disposed adjacent the electric arc furnace;
   (d) aperture means connecting said electric arc furnace to the other end of said preheating zone;
   (e) port means for conducting hot gases from said electric arc furnace to said preheating zone; and
   (f) reciprocal pushing means for periodically injecting a predetermined amount of charge from said preheating zone into said arc furnace.

4. An apparatus according to claim 3 further comprising a reducing zone adjacent one end of said preheating zone and attached thereto.

5. The apparatus of claim 3 wherein said reciprocal pushing means comprises at least one fluid actuated ram.

6. The process of claim 1 wherein steps (a) and (b) comprise:
   (a) continuously feeding a "burden" of iron oxide pellets or iron pellets to a shaft furnace;
   (b) continuously simultaneously preheating and partially reducing the "burden" to iron in the shaft furnace by feeding countercurrently to the "burden" hot reducing gas from an electric arc furnace and/or reducing gases along the height of the shaft furnace.

7. The process of claim 6 wherein said shaft furnace is also directly heated by exhaust gases from at least an auxiliary heater having an outlet connected to the shaft furnace.

8. The process of claim 6 wherein exhaust gases are recirculated to the furnace after being reheated.

9. The process of claim 6 wherein fuel or reductant is pre-heated by exhaust gases from the shaft furnace prior to admission.

10. Apparatus according to claim 4 further comprising:
    gas inlet means opening along the length of said preheating zone; and
    means for conducting hot gases from said arc furnace to said preheating zone.

11. Apparatus according to claim 10 wherein said preheating zone is a vertical shaft furnace.

12. Apparatus according to claim 10 wherein said electric arc furnace is a rotating electric arc furnace.

13. Apparatus according to claim 11 wherein said electric arc furnace is a rotating electric arc furnace.

14. Apparatus according to claim 11 further comprising:
    means for conducting hot gases from said preheating zone to said arc furnace.

15. The apparatus of claim 3 wherein a port communicates with said connecting zone for the feeding of fuel or reductant thereto.

References Cited
UNITED STATES PATENTS

| | | | |
|---|---|---|---|
| 3,080,156 | 3/1963 | Freeman | 266—24 X |
| 3,150,958 | 9/1964 | Collin et al. | 266—24 X |
| 3,163,520 | 12/1964 | Collin et al. | 266—24 X |
| 3,180,916 | 4/1965 | Menegoz et al. | 13—9 |
| 3,372,223 | 5/1968 | Menegoz et al. | 13—9 |

BERNARD A. GILHEANY, *Primary Examiner.*

H. B. GILSON, *Assistant Examiner.*

U.S. Cl. X.R.

13—9